(12) United States Patent
Derand et al.

(10) Patent No.: US 7,104,517 B1
(45) Date of Patent: Sep. 12, 2006

(54) POLYMER VALVES

(75) Inventors: Helene Derand, Taby (SE); Per Andersson, Uppsala (SE); Anders Larsson, Bromma (SE)

(73) Assignee: Gyros Patent AB, Uppsala (SE)

( * ) Notice: Subject to any disclaimer, the term of this patent is extended or adjusted under 35 U.S.C. 154(b) by 454 days.

(21) Appl. No.: 10/030,297

(22) PCT Filed: Jun. 30, 2000

(86) PCT No.: PCT/EP00/06142

§ 371 (c)(1),
(2), (4) Date: Dec. 21, 2001

(87) PCT Pub. No.: WO01/02737

PCT Pub. Date: Jan. 11, 2001

(30) Foreign Application Priority Data

Jun. 30, 1999 (SE) .................... 9902474

(51) Int. Cl.
*F16K 31/00* (2006.01)

(52) U.S. Cl. ............... 251/11; 251/129.06; 60/528

(58) Field of Classification Search ............ 251/11, 251/129.01, 129.06; 137/468; 60/527, 528, 60/530; 604/246, 890.1, 891.1, 892.1
See application file for complete search history.

(56) References Cited

U.S. PATENT DOCUMENTS

| | | | | |
|---|---|---|---|---|
| 4,585,652 A | * | 4/1986 | Miller et al. | 604/891.1 |
| 4,874,500 A | * | 10/1989 | Madou et al. | 204/412 |
| 5,062,841 A | * | 11/1991 | Siegel | 604/891.1 |
| 5,368,571 A | * | 11/1994 | Horres, Jr. | 604/131 |
| 5,368,704 A | * | 11/1994 | Madou et al. | 205/665 |
| 5,377,073 A | * | 12/1994 | Fukaumi et al. | 361/540 |
| 5,417,235 A | * | 5/1995 | Wise et al. | 251/129.06 |
| 5,547,472 A | | 8/1996 | Onishi et al. | |
| 5,643,247 A | | 7/1997 | Fernandez et al. | |
| 5,707,407 A | * | 1/1998 | Ohi et al. | 29/25.03 |
| 5,797,898 A | * | 8/1998 | Santini et al. | 604/890.1 |
| 5,932,799 A | * | 8/1999 | Moles | 73/53.01 |
| 5,984,197 A | * | 11/1999 | Surgarek | 236/93 A |
| 6,015,266 A | * | 1/2000 | Swatek | 417/53 |
| 6,102,897 A | * | 8/2000 | Lang | 604/246 |
| 6,322,682 B1 | | 11/2001 | Arvidsson et al. | |
| 6,406,605 B1 | * | 6/2002 | Moles | 251/129.06 |

(Continued)

FOREIGN PATENT DOCUMENTS

WO  WO-99/58245  11/1999

(Continued)

OTHER PUBLICATIONS

Van Den Berg, A. et al. Micro Total Analysis Systems 2000, May 14-18, 2000, pp. 45-48.

(Continued)

*Primary Examiner*—John Bastianelli
(74) *Attorney, Agent, or Firm*—Fulbright & Jaworski L.L.P.

(57) ABSTRACT

The invention relates to a method of controlling flow of liquids in a micro channel structure. It comprises providing in said micro channel structure plugs (34) of polymer material in said structure, said polymer material in a first state blocking said channel from liquid flow, and in a second state providing a free path-way (32) for liquid flow. Energy is selectively applied so as to cause said polymer to enter a desired one of said first or second states. It also relates to a micro channel valve system, comprising a plurality of such plugs (34). Additionally it comprises a chemical reactor, comprising a plurality of micro chambers interconnected by micro channels, having a valve system according to the invention.

29 Claims, 9 Drawing Sheets

U.S. PATENT DOCUMENTS

| | | | |
|---|---|---|---|
| 6,431,212 B1 * | 8/2002 | Hayenga et al. | 251/129.06 |
| 6,632,656 B1 | 10/2003 | Thomas et al. | |
| 6,653,625 B1 | 11/2003 | Andersson et al. | |
| 6,717,136 B1 | 4/2004 | Andersson et al. | |
| 6,812,456 B1 | 11/2004 | Andersson et al. | |
| 6,812,457 B1 | 11/2004 | Andersson et al. | |
| 6,852,851 B1 | 2/2005 | Tooke et al. | |
| 6,884,395 B1 | 4/2005 | Tooke et al. | |
| 6,919,058 B1 | 7/2005 | Andersson et al. | |
| 6,955,738 B1 | 10/2005 | Derand et al. | |
| 6,967,101 B1 | 11/2005 | Larsson et al. | |
| 6,985,672 B1 | 1/2006 | Kylberg et al. | |
| 6,990,290 B1 | 1/2006 | Kylberg et al. | |
| 2002/0125135 A1 | 9/2002 | Derand et al. | |
| 2003/0029724 A1 | 2/2003 | Derand et al. | |
| 2003/0053934 A1 | 3/2003 | Andersson et al. | |
| 2003/0054563 A1 | 3/2003 | Ljungstrom et al. | |
| 2003/0129360 A1 | 7/2003 | Derand et al. | |
| 2003/0143114 A1 | 7/2003 | Andersson et al. | |
| 2003/0156763 A1 | 8/2003 | Soderman | |
| 2003/0173650 A1 | 9/2003 | Larsson et al. | |
| 2003/0211012 A1 | 11/2003 | Bergstrom et al. | |
| 2004/0058408 A1 | 3/2004 | Thomas et al. | |
| 2004/0096867 A1 | 5/2004 | Andersson et al. | |
| 2004/0099310 A1 | 5/2004 | Andersson | |
| 2004/0120856 A1 | 6/2004 | Andersson et al. | |
| 2004/0202579 A1 | 10/2004 | Larsson et al. | |
| 2005/0019819 A1 | 1/2005 | Tooke et al. | |
| 2005/0042770 A1 | 2/2005 | Derand et al. | |
| 2005/0141344 A1 | 6/2005 | Ekstrand et al. | |
| 2005/0153431 A1 | 7/2005 | Andersson et al. | |
| 2005/0153432 A1 | 7/2005 | Andersson et al. | |
| 2005/0153433 A1 | 7/2005 | Andersson et al. | |
| 2005/0153434 A1 | 7/2005 | Andersson et al. | |
| 2005/0179901 A1 | 8/2005 | Ostlin et al. | |
| 2005/0186685 A1 | 8/2005 | Kange et al. | |
| 2005/0202471 A1 | 9/2005 | Tooke et al. | |
| 2005/0214442 A1 | 9/2005 | Larsson et al. | |
| 2005/0277195 A1 | 12/2005 | Holmquist et al. | |
| 2005/0279925 A1 | 12/2005 | Anderson et al. | |

FOREIGN PATENT DOCUMENTS

| | | |
|---|---|---|
| WO | WO-00/25921 | 5/2000 |
| WO | WO-00/40750 | 7/2000 |
| WO | WO-00/62042 | 10/2000 |
| WO | WO-01/02737 | 1/2001 |
| WO | WO-01/30500 | 5/2001 |
| WO | WO-04/083108 | 9/2004 |
| WO | WO-04/083109 | 9/2004 |
| WO | WO-04/103890 | 12/2004 |

OTHER PUBLICATIONS

Ichijo, H. et al., "Thermo-Responsive Gels", Radiat Phys. Chem. vol. 46 No. 2, pp. 185-190. 1995.

* cited by examiner

POLYMER VALVES

The present invention relates to devices and methods for controlling liquid flow in micro channel structures.

BACKGROUND OF THE INVENTION

In recent years micro chamber and channel structures for performing various reactions and analyses have gained wider use. Examples of scientific fields employing devices comprising such micro channel structures are separation techniques (gas chromatography, electrophoresis), cell biology, DNA sequencing, sample preparation, combinatorial chemistry just to mention a few.

The terms "chamber" and "cavity" will in the context of the invention be used interchangeable if not otherwise specified. A chamber or cavity may be a part of a microchannel.

In certain applications it is common to provide a plurality of micro chambers in which reactions are performed, or in which material is incubated for later use etc. It may often be desirable to move the material from one chamber to another. To this end the chambers are connected by micro channels. Obviously it may become necessary to provide some means of closing said channels after the material has passed therethrough, and also it might be desirable to have the possibility to reopen the channel in order to enable more material to pass through.

In WO 94/29400 there is disclosed a microfabricated channel system. This system is designed for i.a. chemical analytical use, such as electrophoresis and chromatography. In one type of structure a channel and/or cavity system is defined between two plane material layers, the recesses which correspond to the channels and cavities, respectively, being formed in one or both of the opposed layer surfaces. The layers are usually bonded together by gluing.

Alternatively they may be fused together if the two layers consist of thermoplastic material.

In WO 9721090 there is disclosed a microfluidic system having a valve function based on the property of a polymer. Opening of the valve function is actuated by external application of heat. However, the valve function has the drawback that disrupting the heating, e.g. by cooling, will not close the valve.

The type of systems concerned in the present invention may have channels that are of capillary dimensions for liquid flow/transport. The distance between two opposite walls in a channel may be $\leq 1000$ µm, such as $\leq 100$ µm, or even $\leq 10$ µm, such as $\leq 1$ µm. This type of systems may also contain one or more distinct chambers connected to the channels and having volumes being $\leq 500$ µl, such as $\leq 100$ µl and even $\leq 10$ µl such as 1 µl. The depths of the chambers may typically be in the interval $\leq 1000$ µm such as $\leq 100$ µm such as $\leq 10$ µm or even $\leq 1$ µm.

The lower limit for the dimensions is set by manufacturing technology limitations, but can be of the nanometer scale, such as >10 nm, >100 nm or >1000 nm.

One or more liquid transportation systems of this type may be placed on a common plate, for instance rotatable, such as a disc of CD-type. In case of rotatable forms the liquid may be forced through one or more segments of the transportation system by rotating the disc (centripetal force), i.e. the liquid is transported in an outward direction relative the center of the disc. Other types of pressure generating systems may also be used.

A device having one or more liquid transportation system comprising channels and chambers with a depth $\leq 1000$ µm, such as $\leq 100$ µm or even grounder than 10 µm such as $\leq 1$ µm, are further on called a microfabricated device or a micro chamber and channel structure/system or a microfluidic structure/system. The chambers/channels and also the device, structure and system are said to be in the microformat. A microfabricated device typically has its channels and chambers in one plane, such as in the surface of a plate, for instance on a disc. The plate may be circular, oval, rectangular (including in form of a square) or of any other 2D geometric form.

The channels and/or chambers define a flow path pattern in the system, which is delineated by barriers. The barriers can be in form of physical walls, bottoms and tops that are located on or in a planar surface. Hydrophobic barriers combined with aqueous liquids and vice versa for non-polar liquids (see WO 99/58245) have been suggested for defining flow paths and for directing the liquid flow, i.e. to replace the walls and the like in microfabricated devices. There is typically also a second surface applied against the pattern and acting as a top covering the pattern and preventing evaporation of liquid (except for minor parts/dots intended for addition/removal of liquids).

Liquid transportation systems of he type referred to above may also contain valves, pumps, filters and the like.

As mentioned above, in a particular application, a chamber and channel structure is provided in or on a plastic disk. Two or more micro chambers in sequence are aligned radially via a channel. When the disk is spun, material in a chamber located near the center will migrate through the channel to an outwardly located chamber, thereby providing a controllable flow path for reagents to pass from one chamber to another.

However, it is of course difficult to control the flow. The spinning of the disk could be correlated with some position indicating means for locating a sample at a certain point in time, but absent a valve function, there will always be some "spill over" between chambers.

It is known to employ so called stimulus-responsive materials for a number of purposes, e.g. in micro-machines, separation, drug delivery systems etc. This type of material and preparation thereof is discussed in *Radiat. Phys. Chem.* Vol. 46, No 2, pp185–190, 1995, in an article entitled "Thermo-responsive gels", by Ichijo et al.

One possible use is an automatic gel valve provided in a tube. A net is attached to cover the outlet of the tube and a porous PVME (poly(vinyl methyl ether)) gel plug is inserted into the tube and positioned on the net. In response to hot water flowing out through the tube, the gel collapses and the hot water was allowed to freely pass through. When cold water is introduced, the gel reversibly regains its swollen state, thereby blocking the outlet. This concept for a valve function is not possible to apply in a multi-valve structure, since only one gel plug can be inserted in a tube in this way. The already introduced plug will hinder the insertion of subsequent plugs downstream. It is also impossible to arrange subsequent plugs upstream of the already positioned plug, since it will be impossible to provide the obstructing net structure for the upstream located plugs.

In U.S. Pat. No. 5,547,472 (Onishi et al) a perforated balloon attached to a catheter was coated with a stimulus-responsive polymer, enabling the pores to be closed or opened in response to e.g. temperature changes. The polymer is bonded to the surface of the balloon and does not appear to be introduced into the pores.

During the priority year, approaches within the same field as the invention have been published by Beebe et al (Nature 404 (Apr. 6, 2000) 588–590), and Liu et al and Madou et al (in Micro Total Analysis System 2000, Ed. Van der Berg et al., Proceedings of the μTAS 2000 Symposium held at Enschede, the Netherlands 14–18 May, 2000, pages 45–48 and 147–150, respectively).

SUMMARY OF THE INVENTION

Thus, there is a need for means and methods of controlling the liquid flow in micro channel structures, which do not suffer from the problems discussed above. In particular it is desirable and an object of the invention to provide a plurality of selectively operable valve functions arranged one after the other in one capillary channel, optionally between reaction chambers in a micro channel structure.

This object is achieved with the method as claimed in claim 1, and the micro channel valve system as claimed in claim 13, and the chemical reactor as claimed in claim 19, respectively.

Thereby an intelligent polymer (=stimulus-responsive polymer) is employed, having the capability of responding to externally applied energy (stimulus), by changing a property of the polymer so as to change its volume, thereby occupying more or less of the space in which the polymer is confined. For intelligent polymers the change is reversible meaning that once a stimulus (energy) applied is removed then the polymer returns back to its starting volume. By applying energy of appropriate type and magnitude it will be possible to cause a volume change in a desired direction (increase or decrease) to either open or close a pathway through a valve comprising this kind of polymer in a microchannel. It follows that the term "applying energy" includes both positive and negative energy values, i.e. removal and supplying energy.

The required type of energy depends, among others, on the polymer, and includes the so called free energy of chemical systems. The application of energy may take place by heating, irradiation (UV, IR etc) etc or by changing the chemical composition of the liquid in contact with the polymer (e.g. change of pH, of solvent, of concentrations of compounds reacting reversible with the polymer etc). By the term "externally applied" is meant external to the polymer, i.e. application of energy has to take place either via the walls surrounding the polymer or via the liquid in contact with the polymer. This also includes applying the energy to a liquid present in a channel for transport therein by the liquid to the stimulus-responsive polymer in the inventive valve.

In a preferred embodiment the polymer responds to externally applied heat or to external cooling by undergoing a conformational change.

In another embodiment the polymer responds to an applied electrical field.

In still another embodiment the polymer responds to light.

The polymer may in a further embodiment respond to magnetic fields.

Preferably the polymer is provided in gel form (solvated form, closed valve), disposed inside a channel and retained in a fixed position, or even anchored to at least one surface of said channel. When activated, the polymer contracts (the gel collapses or desolvates, opened valve) leaving a free pathway in the channel along that surface or those surfaces to which the polymer is not anchored.

BRIEF DESCRIPTION OF THE DRAWINGS

The invention will now be described with reference to non-limiting examples and with reference to the attached drawings, in which.

DETAILED DESCRIPTION OF PREFERRED EMBODIMENTS OF THE INVENTION

For the purposes of this application, the term "chemical reactor" shall be taken to mean any structure capable of housing chemical and/or biological reagents or reaction partners, and in which these agents can react, i.e. interact with each other, for the purposes of synthesis, analysis, separation or other chemical, physical-chemical or biological processes.

Figure 1:
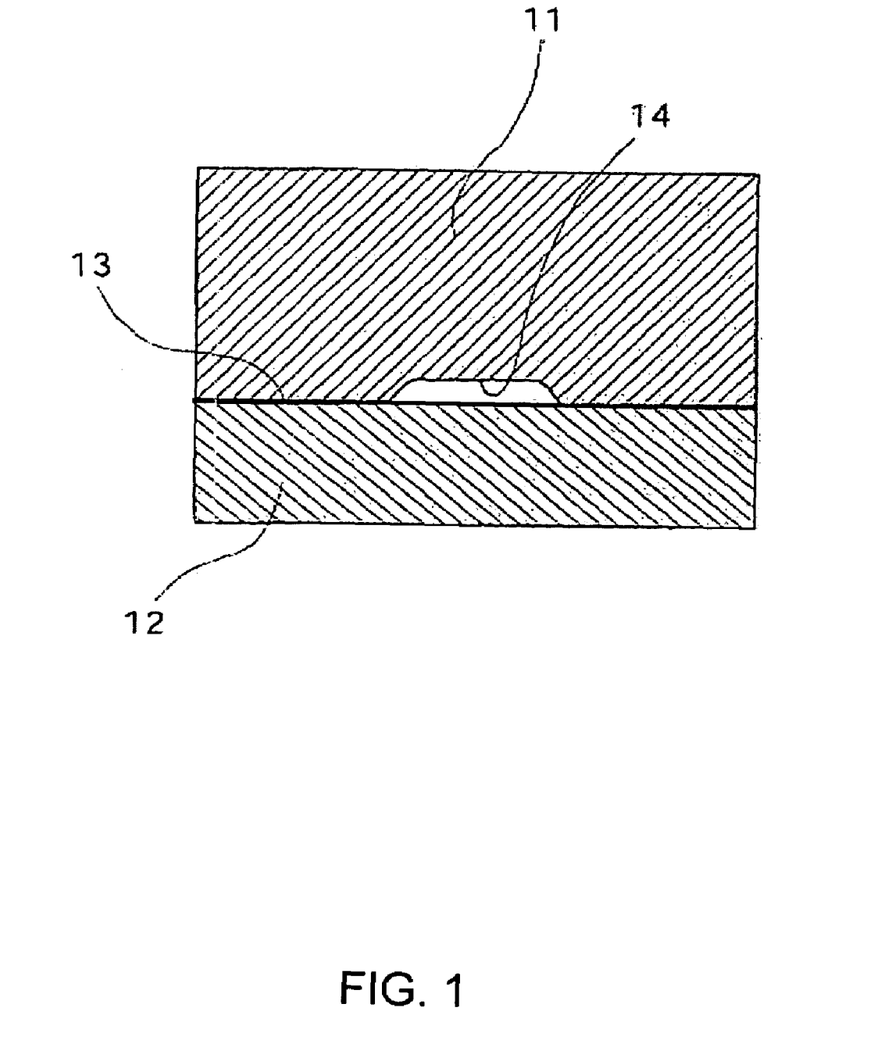
FIG. 1 shows an example of a micro channel and chamber structure according to WO 94/29400, wherein the invention may be employed.

In FIG. 1 there is shown a cross section of a microfabricated channel structure, which forms the subject matter of WO 94/29400.

The structure in FIG. 1 comprises two elements 11, 12 having opposed plane surfaces bonded together. One or both of the surfaces have open channels 14 and or cavities provided therein. The bonding may be effected by applying a thin layer 13 of a solution of a material capable of fusing with and having a lower melting point than that of the materials of the two element surfaces, in a solvent which substantially does not dissolve the element surface material or materials. Solvent is removed, the element surface are brought together and heated to melt the layer 3 so as to bond the surfaces together.

Figure 2:
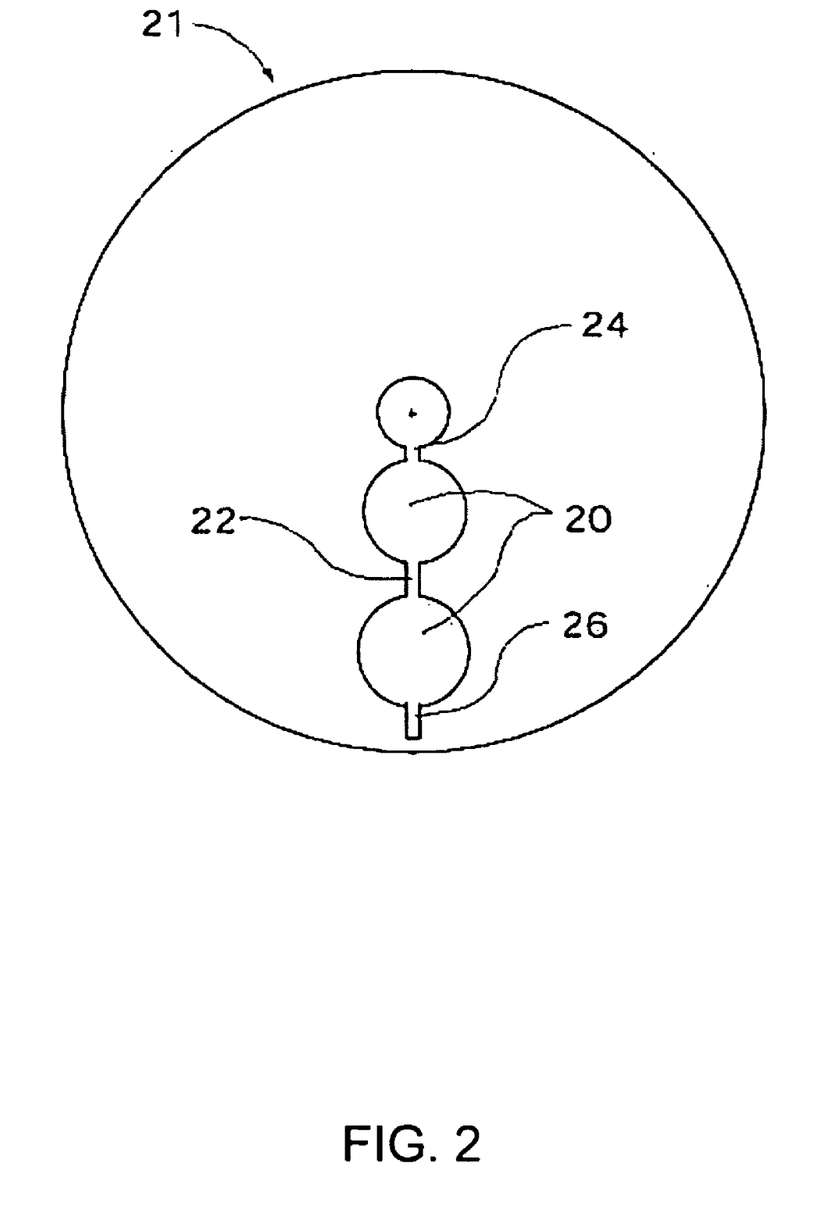
FIG. 2 shows a top view of the structure of FIG. 1 in case the microstructure comprises channels and chambers.

In FIG. 2 a top view of a simplified, exemplary CD (compact disk) type of device 21 is shown, having a chamber and channel structure that may be made e.g. in accordance with the disclosure of WO 94/29400.

Thus, the disk comprises two chambers 20 connected via a channel 22. There is also provided an inlet channel 24 having an upward opening (not shown) for the introduction of reagents, and an outlet channel 26, having an opening (not shown) for the discharge of reacted material.

This particular configuration could be used for e.g. performing a sequential reaction in two steps, one in each chamber 20, the first step being carried out in the innermost (with respect to the radial direction) chamber, and the second in the outermost chamber. This structure thus constitutes a "chemical reactor" as defined above, e.g. for carrying out a synthetic reaction. However, in order to be able to do this in a controlled way, a valve function according to the invention is provided in at least the connecting channel 22 and the outlet channel 26. Thereby the second chamber can be isolated from the first, and the reaction in the first chamber can be carried out to the desired extent. Thereafter the valve is activated and the reaction mixture in the first chamber can be transported into the second chamber where new reagents may be present and the second step is carried out.

The driving force for the transport of material between the chamber can be a centrifugal field created by spinning the disk. For electrophoresis applications, an electric field would be employed. If a column like configuration is employed, i.e. the chambers are arranged vertically, the first above the second, gravity could be used as driving force for the transport.

Now the valve function according to the invention will be described in detail with reference to FIGS. 3a–3e.

According to a first embodiment of the invention (FIGS. 3a and 3b), a polymer 34 capable of effecting a structural change in response to a stimulus (stimulus responsive polymer), is placed in a channel 32 in a channel and chamber micro structure of the type described above. When exposed to said stimulus, the polymer will collapse or contract, and leave at least a fraction of the channel in which it is situated free for liquid to flow there through.

Figure 3:
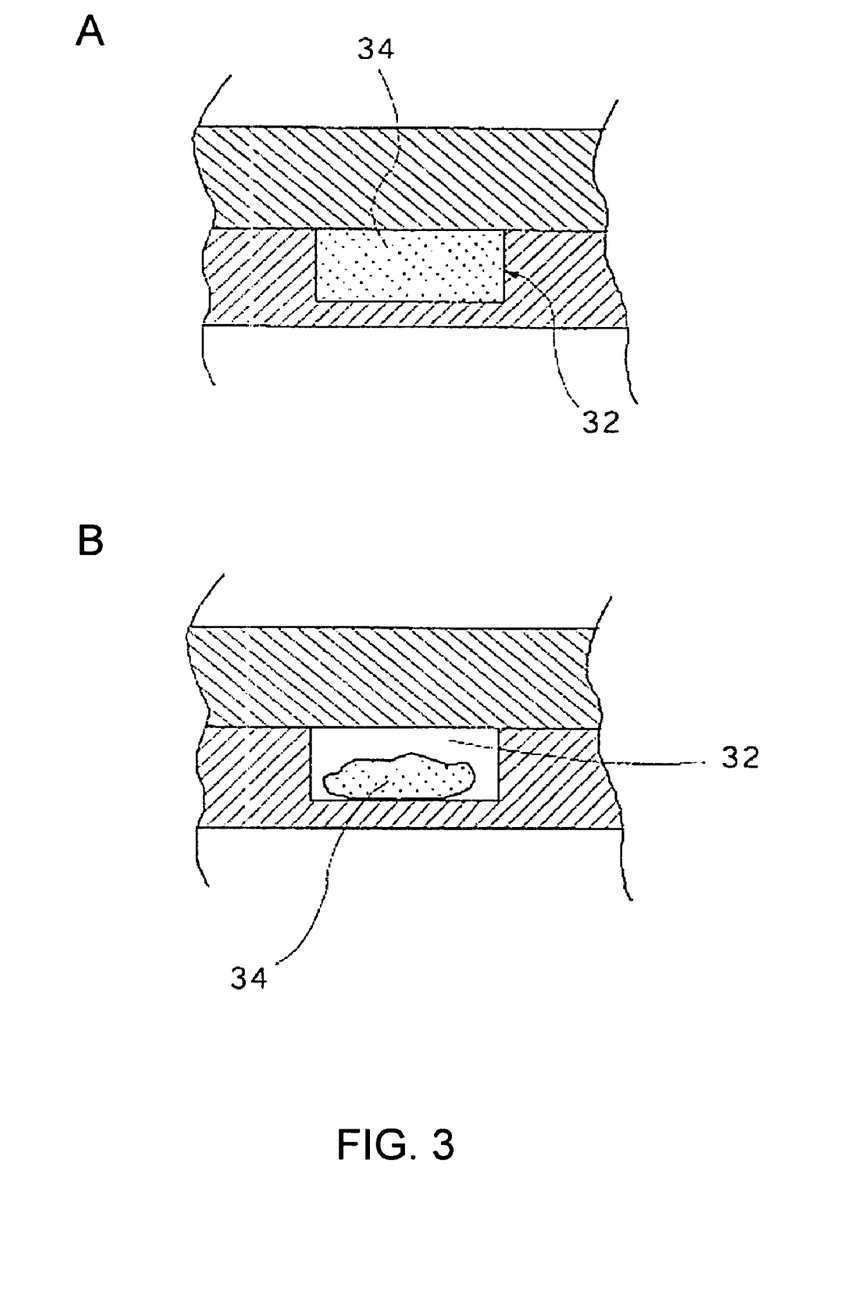
FIG. 3a is a cross section through a channel of a micro channel structure wherein a plug of a stimuli responsive gel is located in a channel, without being anchored to any surface, and in a swollen state.
FIG. 3b is the same cross section as in FIG. 3a, where the polymer has been stimulated to collapse, thereby providing a free flow path.
FIG. 3c is a cross section through a channel of a micro channel structure wherein a plug of a stimuli responsive gel is anchored in one surface of the channel, and in a swollen state.
FIG. 3d is the same cross section as in FIG. 3a, where the polymer has been stimulated to collapse, thereby providing a free flow path.
FIG. 3e shows a cross section of a channel in which the polymer has been anchored to three surfaces of a channel, and is in a contracted state.

According to another embodiment of the invention, a polymer capable of effecting a structural change in response to a stimulus, is anchored in a channel 32 in a channel and chamber micro structure of the type described above. The polymer is anchored in such a way that when stimulated to collapse or contract, it has the possibility to leave at least a fraction of the channel in which it is situated free for liquid to flow through. Normally the cross section of the channels will be rectangular (see FIG. 3c), that is there will be four walls 31a–d, essentially perpendicular to each other. For a configuration of this type, the polymer 34 would preferably be anchored (schematically indicated at 36) to one, two or even three of the walls in said channel. This is shown schematically in FIG. 3c, where the polymer is shown to be in its swollen state, thereby blocking the channel completely. In FIG. 3d a situation is shown where the polymer has been stimulated, e.g. by heating, such that it collapses, thereby opening the channel 32 to liquid flow. Finally, in FIG. 3e an embodiment is shown where the polymer gel 34 has been anchored in three walls of a channel. When stimulated by e.g. heat, the polymer strives to contract, but since it is attached to the walls on three sides, it will form a concave upper surface, leaving a free pathway 32 for fluid flow.

There are two main alternatives for bonding the stimulus-responsive polymer to the channel wall:

(a) chemical bonding/anchoring including covalent attachment or physical adsorption (for instance via ionic forces, van der Waals forces, dipole—dipole interactions etc, and (b) retainment by mechanical means, for instance in chambers with narrow outlets and/or inlets (obstructions).

Alternative (a) requires that the polymer material is only partially bonded to the channel surface, i.e. there should be a non-bonded part leaving a free fluid pathway between the polymer material and the channel surface when the polymer material is in a contracted state. Thus, this variant requires that bonding is occurring only on a fraction of the contact area between the microchannel surface and the plug in a swelled state.

The stimulus-responsive polymer may be bonded to the channel wall e.g. by effecting cross-linking reaction between polymer units of the wall material and the stimulus-responsive polymer respectively (=covalent anchoring/attachment/bonding). There are many ways of anchoring the polymer available to the skilled man, a couple of which are given as non-limiting examples below.

1) For polymers prepared by radical polymerization (e.g. polyacrylamides, polyacrylates, polymethacrylates or polyvinylamides) the channel surface can be modified to contain reactive groups capable of participating in the polymerization. Such groups can be active as initiators (e.g. azo or peroxide groups), copolymerizable groups (e.g. double bonds) or chain transfer groups (e.g. thiols or tertiary amines). Examples of ways to introduce the reactive groups are listed below:

reacting glass, silica or silicon surfaces with a methacryl silane, a vinyl silane or a thiol silane.

coating various surfaces with a thin layer of a polymer containing double bonds, such as allyl glycidyl agarose, polybutadiene or an unsaturated polyester resin.

subjecting the polymer surfaces to plasma (glow discharge) treatment under such conditions that double bonds are formed on the surface.

2) More generally applicable ways could be to provide a rough surface with possibilities for mechanical interlocking of the polymer or to create an interpenetrating polymer network in the interphase between the polymer and a polymeric substrate.

It is also possible to use mechanical means to retain the polymer gel in a fixed position. These options will be described further in the Examples below.

The material in said micro channel surface can be subjected to a variety of surface treatments, such as wet etching, plasma treatment, corona treatment, UV treatment, grafting, adsorption coating, in order to improve the surface properties.

The stimulus, which can cause a structural change of the polymer in the pores, is selected from pH, ion, solvent composition, chemical substance, heat, electricity and light such as ultraviolet radiation. The structural change of polymer is swelling and contraction. The invention utilizes the nature of intelligent polymers that an external stimulus can trigger a reversible structural change between a solvated state and a desolvated state.

An important feature of the polymers used in the valves of the present invention is that they switch from a swelled state (solvated state) to contracted state (desolvated state) or vice versa in a reversible manner as discussed elsewhere herein. Thus the state at hand is dependent on the level/ intensity of a stimulus applied, meaning for instance that above a certain critical level/intensity (magnitude) of the stimulus one state is at hand. For chemical substances the level/intensity typically corresponds to concentrations. When going below the critical level, the polymer is transformed to the other state. For a thermo-responsive polymer having a lower critical solution temperature (LCST), an increase in temperature passing the LCST will cause a switch from the solvated to the desolvated state and vice versa when changing the temperature in the opposite direction. When using a polymer having an upper critical solution temperature (UCST) the temperature increase will result in a switch from a desolvated state to a solvated state.

For example, a polymeric electrolyte gel is known to undergo a structural change owing to an osmotic pressure change by electrolyte ions in the polymer chain and interaction of electrolyte ions with a solvent. Then the polymeric electrolyte gel undergoes reversible contraction in response to a change of pH, solvent composition and ion concentration. An electric stimulus (in terms of potential, voltage and current) can be effectively utilized for the polymers contraction response since it can bring a local change of pH or ion concentration. Among non-ionic polymers, e.g. polymers and copolymers of vinyl methyl ether and N-isopropylacrylamide undergo a change between hydrophilic and hydrophobic states in response to heat and provide a contraction response in an aqueous solvent. Then by utilizing heat generation by electric resistance or heat of mixing, the effective diameter of the pores can be changed. A stimulus given by a chemical substance is such that polymer chains swollen in pores are contracted if a complex is formed by utilizing hydrogen bonds or the like. For example, if a carboxylic polymer swollen in pores is contacted with an agent containing a polyether, the polycarboxylic acid reacts with the polyether to form a high molecular weight complex with concomitant contraction, resulting in the pores increasing an open passage for fluids. The valves according to the invention are provided at selected points in a micro channel system. They can be prepared e.g. by photopolymerizing the stimulus responsive polymer in situ, where the irradiation is made through a mask, such that the polymer is only formed in the illuminated areas. After e.g. heat contraction of the polymer, residual monomers can be washed out of the channel system. It is also conceivable as an alternative to irradiation with light to employ microwaves, electron beams or any other type of radiation that is possible to mask off.

A further conceivable method is to form the polymer in the entire channel system, and then selectively degrading it (e.g. by light or radiation) everywhere except in the designated areas. The degradation products would then be washed out after contraction of the valve areas.

The invention will now be illustrated by way of the following non-limiting examples.

EXAMPLES

In the following Examples a CD (compact disk) type device comprising micro channels and chambers as shown schematically in FIG. 2 can be used.

Example 1

N-isopropylacrylamide (0.5 g) and N,N-methylene bisacrylamide (0.01 g) was dissolved in water (4.0 ml). 0,1 ml of a photo-initiator (Irgacure 184, Ciba-Geigy, 100 mM in ethylene glycol) was then diluted in 0.5 ml water, before mixing it with the monomer solution. A drop of the monomer solution was transferred to a channel in a microfabricated CD disc made of plastic (polycarbonate), and covered by a microscope glass cover slip. The monomer solution inside the channel was then illuminated with UV light through the glass cover slip for 10 minutes in order to polymerize the monomers.

Figure 5:
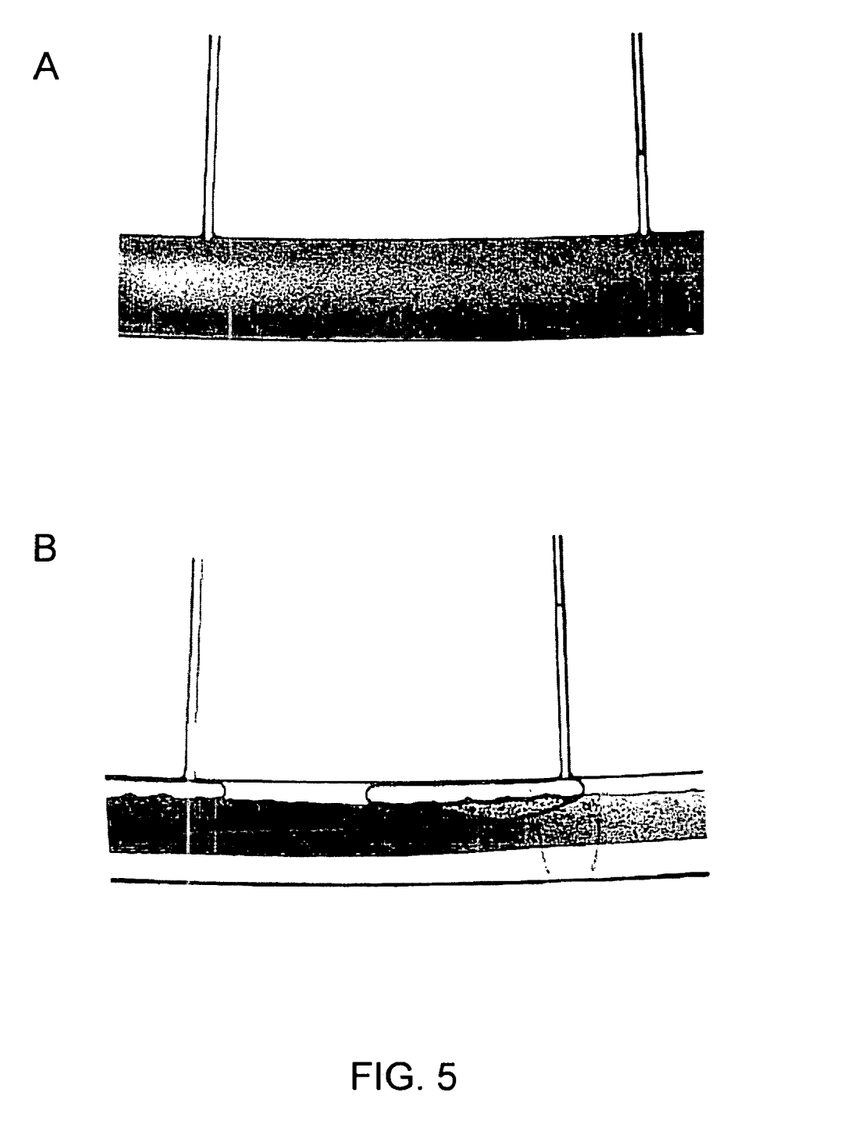
FIG. 5a is microphotograph of the gel prepared in Example 1 in a swollen state.
FIG. 5b is the same gel as shown in FIG. 5a in contracted state.

When the polymerization was completed, a hydrostatic pressure using an aqueous dye solution was applied to the inlet of the channel. No liquid was seen to flow through the channel (see FIG. 5a). The CD disc was then left at 40° C. for 5 minutes, and a hydrostatic pressure was again applied to the channel. This time the liquid immediately flowed through the channel (see FIG. 5b). The CD disc was then allowed to return to room temperature, and again a hydrostatic pressure was applied. No liquid flowed through the channel. A picture of the valve before and after heat treatment is shown in FIGS. 5a and 5b respectively.

Example 2

A microscope cover glass was wiped with methacryloxytriethoxysilane and rinsed with water and ethanol. A gel-forming solution was prepared from 0.5 g N,N-diethylacrylamide, 10 mg N,N'-methylenebisacrylamide, 6.5 ml distilled water and 0.1 ml of a 0.1 M solution of Irgacure-184 in ethylene glycol. A droplet of this solution was placed in a channel of a polycarbonate CD disc having a recessed 100 µm deep channel pattern on its surface, and a microscope cover glass was placed over the droplet with the treated side facing downwards. The package was placed on a cold steel plate under an array of low pressure mercury lamps and illuminated for 5 min to polymerize the monomers. A transparent gel was formed in the channels, which turned opaque upon heating to 45° C., and again turned transparent when it was cooled below room temperature. An aqueous dye solution was able to penetrate the channel system at 45° C., thus proving that a free path-way for fluid flow was provided. At room temperature the channel was blocked and no dye solution penetrated. The cover glass was then pryed.

Example 3

A gel-forming solution was prepared from 0,5 g N,N-diethylacrylamide, 10 mg N,N'-methylenebisacrylamide, 6,5 ml distilled water and 0,1 ml of a 0,1 M solution of Irgacure-184 in ethylene glycol. A droplet of this solution was placed in a channel of a polycarbonate CD disc having a recessed 100 µm deep channel pattern on its surface, and a microscope cover glass was placed over the droplet. The package was placed on a cold steel plate under an array of low pressure mercury lamps and illuminated for 5 min to polymerize the monomers. A transparent gel was formed in the channels, which turned opaque upon heating to 45° C., and again turned transparent when it was cooled below room temperature. An aqueous dye solution was able to penetrate the channel system at 45° C., thus proving that a free path-way for fluid flow was provided. At room temperature the channel was blocked and no dye solution penetrated.

Example 4

The same procedure as in Example 2 was repeated, but the cover glass was partially masked with an aluminum mask during illumination. The thermo-responsive gel was formed only in the illuminated parts of the channel system.

Example 5

Figure 4:
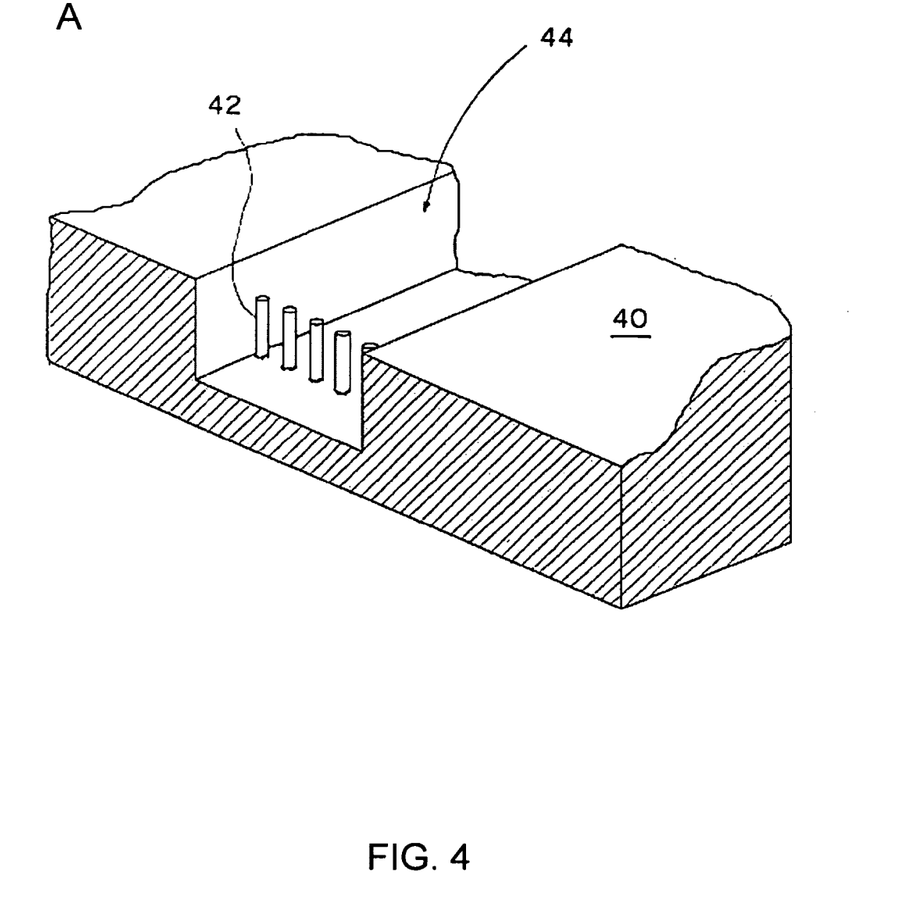
FIG. 4a is a perspective view, partially in cross section of a channel having a grid as a mechanical means to prevent a gel plug from moving.
FIG. 4b is a perspective view, partially in cross section, of a channel having a plurality of pointed protrusions provided over a surface of a channel, providing anchoring means to prevent a gel plug from moving.
FIG. 4c is a perspective view, partially in cross section of a channel having side rooms in which a gel plug can be inserted, to prevent it from moving.

A micro channel structure in a microfabricated CD disc 40 made of plastic (polycarbonate) is made, having the structure as shown schematically in perspective in FIG. 4. In this case there are provided mechanical obstructions in the channel 44 at the points where the valve is desired. These obstructions can be in the form of a grid of vertically arranged pins 42, as shown in FIG. 4a which is a cross section through a substrate in which a channel having such obstructions has been made. The gel (not shown) is polymerized in the channel upstream of the grid, using the same procedure as in Example 1.

When the polymerization is completed, a hydrostatic pressure using an aqueous dye solution is applied at room temperature to the inlet of the channel. No liquid was seen to flow through the channel. The CD disc is then left at 40° C. for 5 minutes, and a hydrostatic pressure is again applied to the channel. This time the liquid immediately flowed through the channel. The CD disc is then allowed to return to room temperature, and again a hydrostatic pressure is applied. No liquid flowed through the channel.

Example 6

A micro channel structure in a microfabricated CD disc made of plastic (polycarbonate) is made, having the structure as shown schematically in FIG. 4b. In this case there are provided mechanical obstructions in the form of protrusions 46 in the channel, distributed over the area where the polymer plug is to be located, i.e. at the point where the valve is desired. These obstructions can be shaped in the same way as those shown in FIG. 4a, or could be shorter, rather like nipples, as shown in FIG. 4b, and will act as retaining elements for the gel. The gel is polymerized (not shown) in the channel in the area where the pins are located, using the same procedure as in Example 1. Thus, the pins will be molded inside the gel plug, thereby preventing it from moving in the channel.

When the polymerization is completed, a hydrostatic pressure using an aqueous dye solution is applied at room temperature to the inlet of the channel. No liquid is seen to flow through the channel. The CD disc is then left at 40° C. for 5 minutes, and a hydrostatic pressure is again applied to the channel. This time the liquid immediately flowed through the channel. The CD disc is then allowed to return to room temperature, and again a hydrostatic pressure is applied. No liquid flowed through the channel.

Example 7

Of course other anchoring methods may be employed. One alternative is to provide a widened portion of the channel, such as the "side rooms" 48 as shown schematically in FIG. 4c. A gel plug is provided such that it is "anchored" in the side rooms of the channel 44. If the side rooms are made large enough, the plug will be effectively prevented from moving in the channel under hydrostatic pressure.

The invention claimed is:

1. A method of controlling flow of liquids in a micro channel structure comprising the steps of:
   providing a micro channel and a chamber in the microformat, said micro channel structure defining a liquid transportation system that is present on a plate comprising one or more of said liquid transportation systems, wherein the distance between two opposite walls in said micro channel is about $\leq 1000$ µm to about $\leq 1$ µm and the depth of a chamber is about $\leq 1000$ µm to about $\leq 1$ µm; providing in at least one position in said micro channel structure a plug of polymer material which comprises an intelligent polymer having the property of responding to externally applied energy by changing its volume, said polymer material in a first state providing a first volume blocking said micro channel from liquid flow, and in a second state providing a second volume giving pathway for liquid flow; and
   selectively applying energy of appropriate type and magnitude to the polymer material of a selected one of said at least one plug so as to cause the volume change between said two states, thereby bringing said polymer to a desired one of said first or second states.

2. The method of claim 1, wherein said intelligent polymer is selected from the group of polymers consisting of heat responsive polymers, light responsive polymers, magnetically responsive polymers, pH responsive polymers and polymers responsive to electric fields.

3. The method of claim 1, wherein said polymer material is at least partially anchored to a surface inside said micro channel.

4. The method of claim 1, wherein the polymer material is chemically bonded to an inner surface in said micro channel structure.

5. The method of claim 1, wherein the polymer material is anchored in the micro channel structure by means of a mechanical obstruction in the micro channel structure.

6. The method of claim 1, wherein the material in the inner surface of said micro channel structure comprises material selected from the group consisting of plastics, rubbers, metals, carbon, inorganic oxides, nitrides, carbides, silicon, and quartz.

7. The method of claim 6, wherein said material in said micro channel surface is subjected to a surface treatment selected from the group consisting of wet etching, plasma treatment, corona treatment, UV treatment, grafting, and adsorption coating.

8. The method of claim 1, wherein the step of applying energy comprises heating the polymer material, wherein the polymer material comprises a heat responsive polymer.

9. The method of claim 8, wherein said heating is performed by irradiating with electromagnetic radiation.

10. The method of claim 1, wherein the step of applying energy comprises illuminating the polymer material with light of a suitable wave length, wherein the polymer material comprises a light responsive polymer.

11. The method of claim 1, wherein the step of applying energy comprises exposing the polymer material to a magnetic field, wherein the polymer material comprises a magnetic responsive polymer.

12. The method of claim 1, wherein the step of applying energy comprises exposing the polymer material to an electric field, wherein the polymer material comprises a polymer responsive to electricity.

13. A micro channel valve system comprising a plug of a polymer material, wherein said polymer material comprises an intelligent polymer having the property of responding to externally applied energy by changing its volume, said plug being present at a selected location within a micro channel structure comprising a channel and a chamber in the microformat, said micro channel structure defining a liquid transportation system that is present on a plate comprising one or more of said liquid transportation systems, wherein the distance between two opposite walls in said channel is about ≦1000 μm to about ≦1 μm and the depth of said chamber is about ≦1000 m to about ≦1 μm.

14. The valve system of claim 13, wherein said intelligent polymer is selected from the group of polymers consisting of heat responsive polymers, light responsive polymers, magnetically responsive polymers, polymers responsive to electric fields and pH-responsive polymers.

15. The valve system of claim 13, wherein said polymer material comprising said intelligent polymer is selected from the group of polymers consisting of polyvinylethers, polyacrylamides, polyvinylamides, polyalkyleneglycols, celluloseethers, polyacylates, polymethacrylates, N,N-diethylacrylamide, N,N-diethylbisacrylamide, and N-vinylcaprolactam.

16. The valve system of claim 13, wherein said polymer material is anchored inside said channel by chemical bonding.

17. The valve system of claim 13, wherein said polymer plug is anchored only over a fraction of the contact surface between the plug in a swelled state and the inner surface of said micro channel structure.

18. The valve system of claim 13, wherein said polymer plug is retained in a fixed position inside said micro channel structure by mechanical means.

19. A chemical reactor comprising a plurality of micro chambers interconnected by micro channels that are part of a liquid transportation system, having a valve system of claim 13, provided in at least one of said micro channels.

20. The chemical reactor of claim 19, wherein said chambers and micro channels are provided in a planar substrate.

21. The chemical reactor of claim 20, wherein the substrate is a material selected from the group consisting of plastics, rubbers, metals, carbon, inorganic oxides, nitrides, carbides, silicon, and quartz.

22. The chemical reactor of claim 20, wherein the substrate is circular.

23. The chemical reactor of claim 20, wherein the substrate is rectangular.

24. The method of claim 1 wherein said at least one position in said micro channel structure is a plurality of positions.

25. The method of claim 6, wherein said plastics are selected from the group consisting of polycarbonates, polystyrenes and cycloolefin polymers.

26. The valve system of claim 13, wherein said intelligent polymer material is a polymerization product of N-isopropylacrylamide and N,N-methylene bisacrylamide.

27. The chemical reactor of claim 21, wherein said plastics are selected from the group consisting of polycarbonates, polystyrenes and cycloolefin polymers.

28. The valve system of claim 13, wherein said chamber and said micro channel are defined between two planar surfaces applied to each other.

29. The method of claim 1, wherein said micro channel and said chamber are defined between two planar surfaces applied to each other.

* * * * *